US006659250B2

(12) United States Patent
Nestler et al.

(10) Patent No.: US 6,659,250 B2
(45) Date of Patent: Dec. 9, 2003

(54) ELECTRO-MECHANICAL TORQUE CONTROL-ELIMINATION OF STOPPING NOISE

(75) Inventors: Frank Nestler, Bonn (DE); Derek Wilson, Siegburg (DE)

(73) Assignee: GKN Automotive GmbH, Lohmar (DE)

( * ) Notice: Subject to any disclaimer, the term of this patent is extended or adjusted under 35 U.S.C. 154(b) by 33 days.

(21) Appl. No.: 10/036,706

(22) Filed: Dec. 21, 2001

(65) Prior Publication Data

US 2002/0088683 A1 Jul. 11, 2002

(30) Foreign Application Priority Data

Dec. 27, 2000 (DE) .......................................... 100 65 355

(51) Int. Cl.[7] ................................................ F16D 11/08
(52) U.S. Cl. .................... 192/84.6; 192/93 A; 318/299; 318/101; 318/362
(58) Field of Search ............................. 192/84.6, 93 A; 318/299, 434, 362, 101

(56) References Cited

U.S. PATENT DOCUMENTS

| | | | | | |
|---|---|---|---|---|---|
| 4,418,562 A | * | 12/1983 | Sakai et al. | .................... | 72/444 |
| 4,481,562 A | * | 11/1984 | Hickson | .................... | 362/183 |
| 4,651,855 A | * | 3/1987 | Grunberg | .................... | 477/175 |
| 4,763,219 A | * | 8/1988 | Nakamura | .................... | 361/23 |
| 4,976,347 A | * | 12/1990 | Sakakibara et al. | .................... | 192/20 |
| 5,106,349 A | * | 4/1992 | Botterill et al. | .................... | 475/150 |
| 5,279,401 A | * | 1/1994 | Stall | .................... | 192/52.4 |
| 5,469,215 A | * | 11/1995 | Nashiki | .................... | 318/432 |
| 6,213,259 B1 | * | 4/2001 | Hanson et al. | .................... | 188/156 |
| 6,236,176 B1 | * | 5/2001 | Uebelein et al. | .................... | 318/287 |
| 6,279,691 B1 | * | 8/2001 | Takahashi et al. | .................... | 188/72.8 |

* cited by examiner

Primary Examiner—Charles A Marmor
Assistant Examiner—Eric M. Williams

(57) ABSTRACT

A method of returning an electromechanical axial setting device, particularly suited for friction couplings. The axial setting device includes two setting rings centered on a common axis, one of which is axially held, with the other one being axially displaceably mounted, and one of which is rotationally fixedly held in a housing so as to be prevented from rotating, with the other one being rotatingly drivable. On their respective end faces facing one another, the two setting rings each include an identical multitude of circumferentially extending grooves. Each of the grooves, in a plan view of the end faces, define a depth which rises in the circumferential direction. Pairs of grooves in the setting rings each accommodate a ball. The rotatingly drivable setting ring is connected to an electric motor in respect of drive. The axially displaceable setting ring is loaded by pressure springs towards the axially held setting ring. When applying a positive voltage to the electric motor, the axial setting device moves into an advanced position and when the voltage is disconnected from the electric motor, the axial setting device is returned to a starting position.

12 Claims, 11 Drawing Sheets

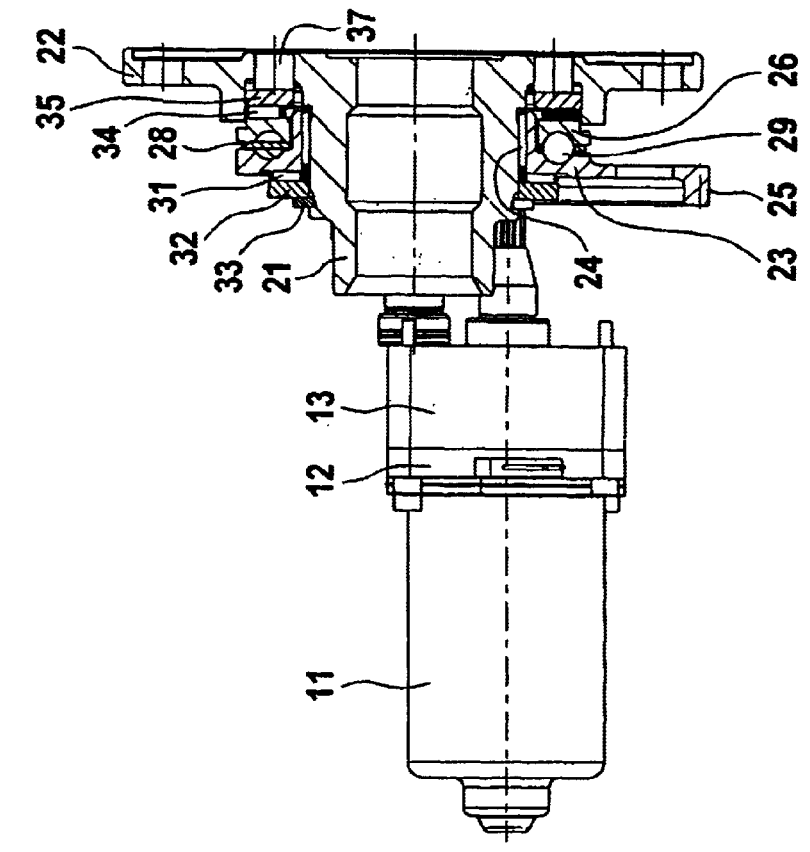
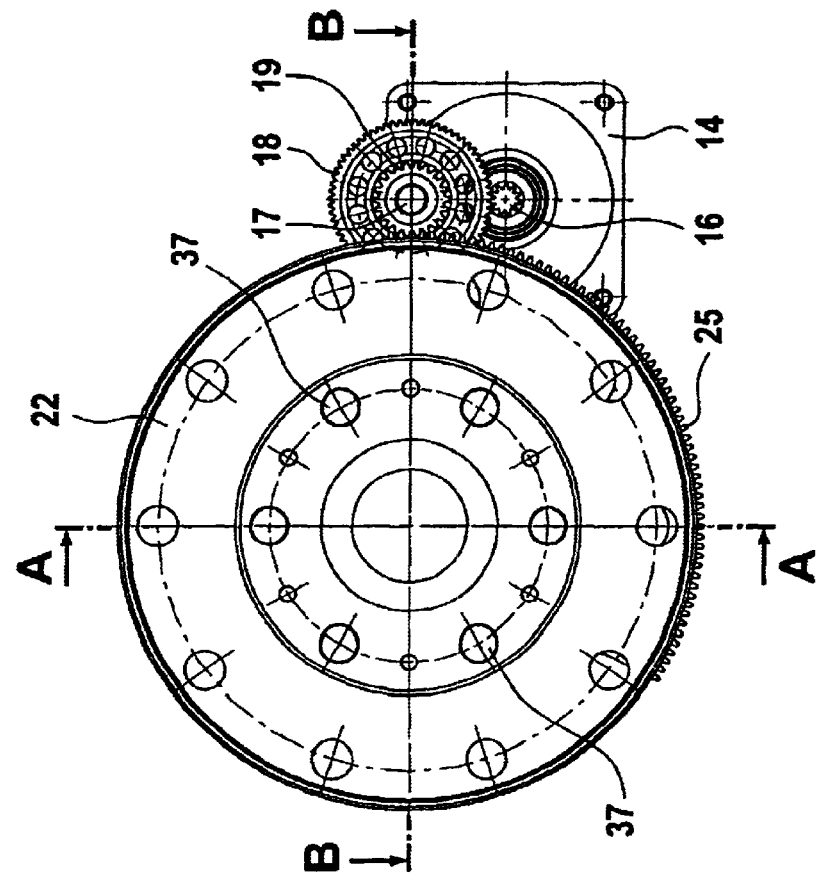

ELECTRO-MECHANICAL TORQUE CONTROL-ELIMINATION OF STOPPING NOISE

TECHNICAL FIELD

The present invention relates to a method and system of controlling an electromechanical axial setting device, particularly suited for friction couplings.

BACKGROUND OF THE INVENTION

The invention relates to a method of returning an electromechanical axial setting device, wherein the axial setting device includes the following: two setting rings centered on a common axis, one of which is axially held, with the other one being axially displaceably mounted, and one of which is rotationally fixedly held in a housing, with the other one being rotatingly drivable. The two setting rings, on their respective end faces facing one another, each include an identical plurality of circumferentially extending grooves. The grooves, in a plan view of the end faces, have depths which rise in the same circumferential direction. Pairs of grooves in the two setting rings each accommodate a ball. The rotatingly drivable setting ring is connected to an electric motor in respect of drive, and the axially displaceable setting ring is loaded by pressure springs towards the axially held setting ring. When applying a positive voltage to the electric motor, the axial setting device moves into an advanced position, and when disconnecting the voltage from the electric motor, the axial setting device returns into a starting position.

Furthermore, the invention relates to an electromechanical axial setting device for carrying out the inventive method.

Axial setting devices of the foregoing type have a simple and compact design and comprise short reaction times, such as they are required, for example, in friction couplings in locking differentials. The use of such setting devices is described in DE 39 20 861 C2, DE 39 15 959 C2, DE 39 09 112 C2, DE 38 15 225 C2 and DE 100 33 482.2. In these publications, it is mentioned several times that to make locking differentials comprising such setting devices compatible with vehicles provided with ABS systems and/or ESP systems, it must be possible for such axial setting devices to be returned quickly. Such a return motion is achieved by return springs. When in the form of spiral springs, they rotate the rotated setting ring backwards directly and thus allow the axially displaced setting ring to return. When in the form of axial springs, with groove assemblies without self-inhibition, they push back the axially displaced setting ring and thus rotate the rotated setting ring backwards.

Axial setting devices of the foregoing type, especially those wherein reinforced return springs or voltage reversing circuits effect a rapid return for the purpose of achieving a rapid disconnection of the friction coupling, at the completion of the return motion, experience a hard jerk due to the balls hitting the groove ends of the ball grooves of the setting ring. This jerk is so pronounced that in a vehicle it is regarded as an unacceptable adverse effect on the comfort conditions in the vehicle. Furthermore, if the driver is unprepared for such a jerk, it can make the driver feel insecure and cause him to regard the jerk as damage to the vehicle.

It is therefore necessary to achieve a rapid return motion and a dampened stopping behavior. It would therefore be desirable to provide a new method of returning an electromechanical axial setting device, especially for friction couplings.

SUMMARY OF THE INVENTION

The present invention provides an improved method and system for controlling an electromechanical axial setting device. The present invention provides that, during the return motion, shortly before the starting position is reached, the electric motor is short-circuited for the purpose of generating a braking moment. A further method in accordance with the invention provides that, during the return motion, shortly before the starting position is reached, a positive voltage is briefly applied to the electric motor for the purpose of generating a braking moment. At the end of the returning process, shortly before the balls reach the end stops, the means described here thus offer an electric braking method which can be achieved with very few additional switching mechanisms, while the basic mechanical configuration can remain unchanged.

A device in accordance with the invention includes a rotational position sensor which is arranged at one of the rotating parts, e.g. at the first setting ring and which, shortly before the balls reach the end stops in the ball grooves, initiates the respective switching operation, i.e. it either initiates short-circuiting or applies a positive voltage. In one embodiment it is also possible to replace the non-contact sensor by switching contacts which first, shortly before the end stops are reached, effect short-circuiting or the application of voltage and which, when the balls reach the end stops in the ball grooves, disconnect the electric motor. The means for dampening the stopping effect and for braking the returning motion of the electric motor constitute much simpler means than would be required by mechanical brakes and/or damping devices.

To accelerate the return motion, a negative voltage may be applied to the electric motor for returning purposes. For accelerated control cycles, this method can be improved further by the following steps. For returning purposes, first a negative voltage is applied to the electric motor and when the idling speed of the electric motor has been reached, the electric motor is disconnected from the voltage.

By way of the control strategy described herein it is possible to save a great deal of time as compared to the simple passive return motion initiated by spring force in that, especially during the acceleration phase, the spring force is supported by the drive effected by the electric motor. Surprisingly, time is also saved as compared to a permanently applied negative voltage during the return motion, the effect of which permanently applied negative voltage is counteracted by the induced counter voltage if the idling speed is exceeded.

Another embodiment includes a voltage reversing circuit for the electric motor and a motor speed recording device for the electric motor which are logically connected to one another via the idling speed of the electric motor in such a way that the voltage reversing circuit is disconnected if, in the course of the device being returned, the idling speed of the electric motor is reached.

To be able to determine the point in time at which the negative voltage at the electric motor is interrupted, it is possible to use direct speed monitoring means. However, if the dynamic behavior of the axial setting device is known, a simple time switch can be used for limiting, in terms of time, the connection time of the negative voltage at the electric motor.

In a preferred embodiment, use is made of a permanently excited direct current motor.

Other advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 1 shows an inventive axial setting device in a first axial view.

FIG. 2 shows the device according to FIG. 1 in a section along line A—A.

DETAILED DESCRIPTION OF THE INVENTION

Figure 3:
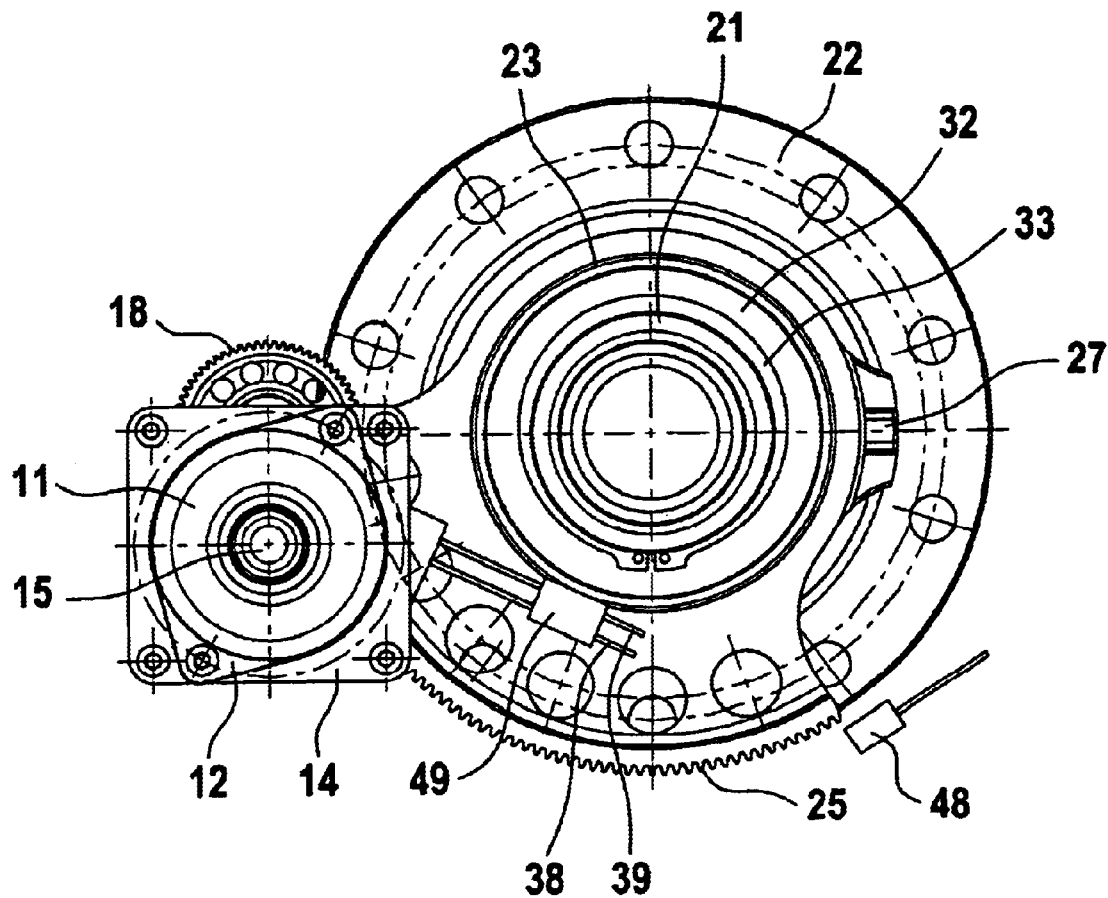
FIG. 3 shows the device according to FIG. 1 in an axial counter view relative to FIG. 1.
Figure 4:
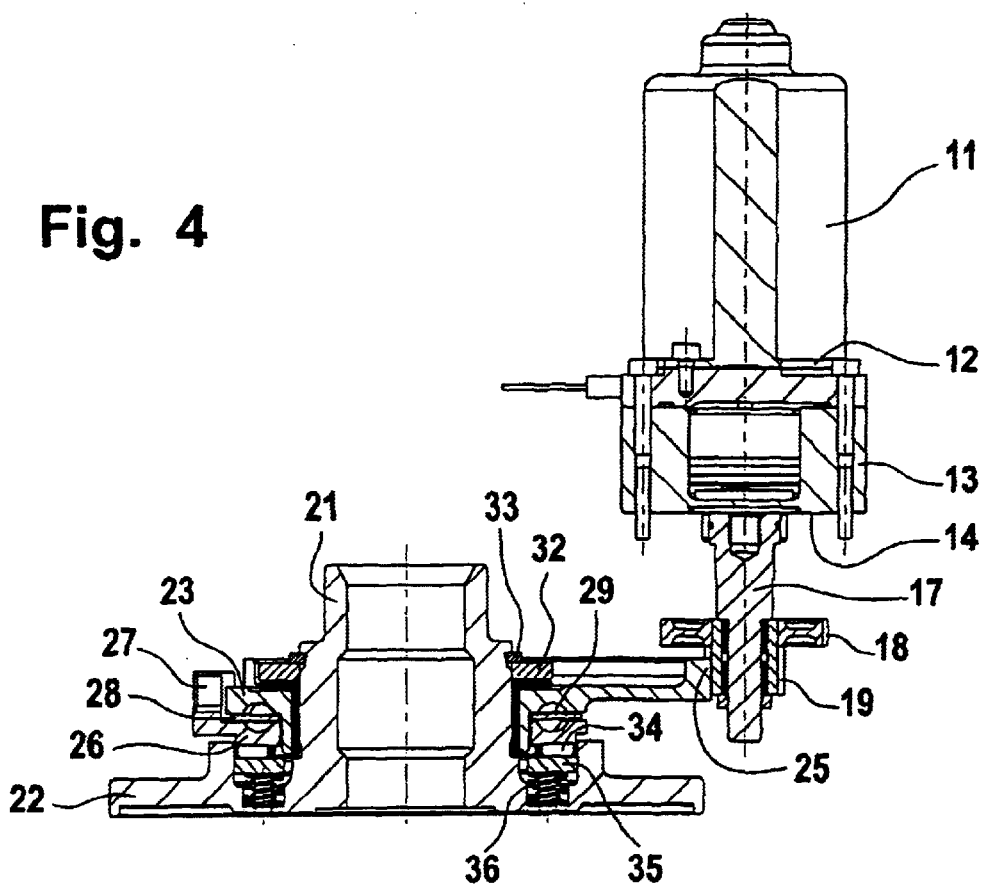
FIG. 4 shows the device according to FIG. 1 in a section along line B—B.
Figure 5:
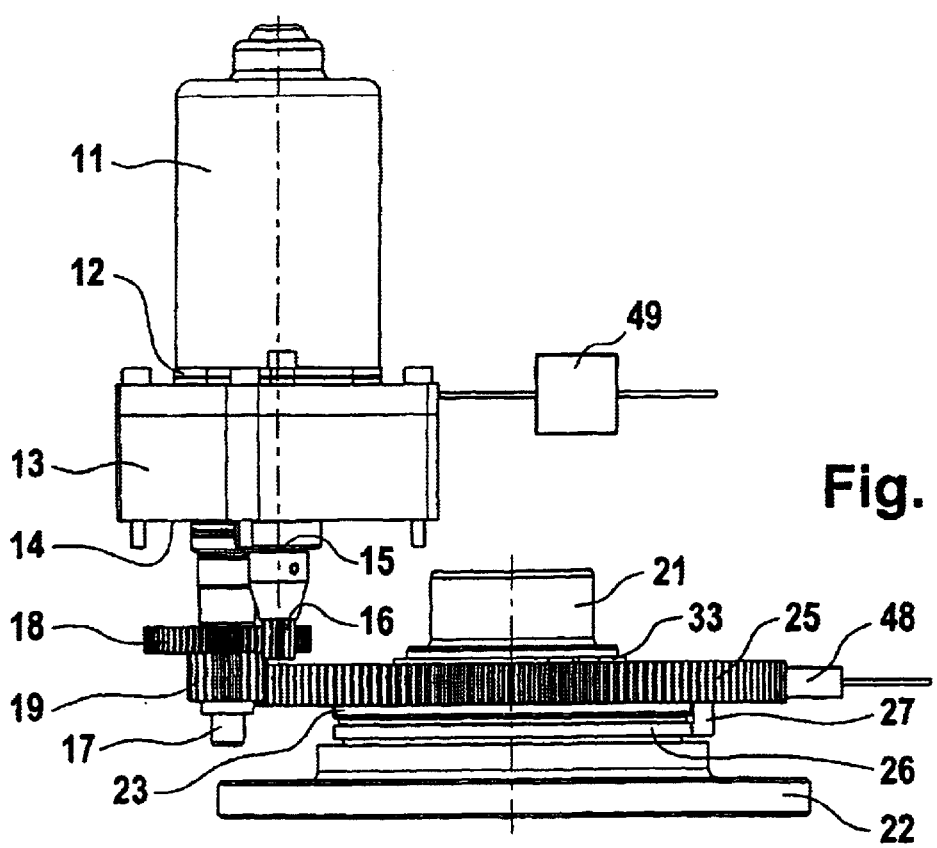
FIG. 5 shows the device in the illustration according to FIG. 4, but in a plan view.
Figure 6:
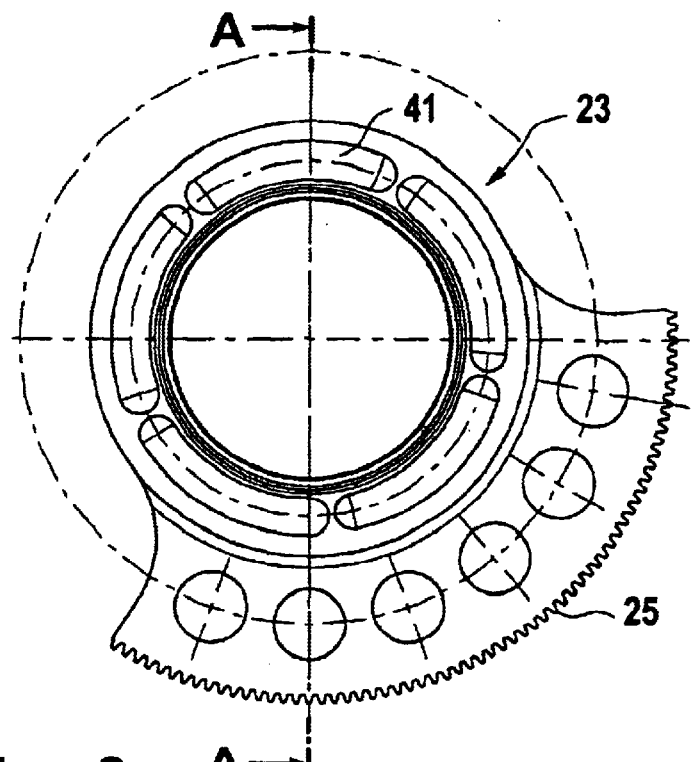
FIG. 6 shows a rotatingly drivable setting ring of the device in the form of a detail in an axial view of the grooves.
Figure 7:
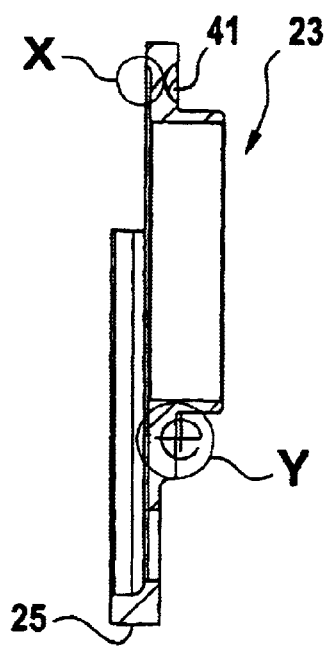
FIG. 7 shows the setting ring according to FIG. 6 in a sectional view along line A—A.

FIGS. 1 to 5 will largely be described jointly. By way of a first flange plate 12, an electric motor is bolted on to a bearing block 13 which forms a second flange plate 14. In the bearing block 13, there is supported an extension of the motor shaft 15 which carries a first pinion 16. In the bearing block 13, there is also supported an ancillary shaft 17 which carries a further pinion 18 which engages the pinion 16 and which, for the purpose of forming a reduction stage, carries a further pinion 19. Via the bearing flange 14 the bearing block 13 is secured, for example, to a drive housing. A bearing sleeve 21 whose axis extends parallel to the motor axis is shown to include a flange plate 22 which is rotatably supported in the drive housing. A first setting ring 23 is supported on the bearing sleeve 21 by way of a radial bearing 24. The setting ring 23 includes a tooth segment 25. The pinion 19 of the ancillary shaft 17 engages the tooth segment 25 of the first setting ring 23. In parallel to the first setting ring 23, there is arranged a further setting ring 26 which, by way of a holding lug 27, in a rotationally fast way can engage the drive housing. Between the setting rings 23, 26, there is arranged a plurality of balls 29 which are held in a cage 28 and by way of which the second setting ring 26 is centered on the first setting ring 23. The first setting ring 23 is supported via an axial bearing 31 on a disc 32 which is secured by a securing ring 33 on the bearing sleeve 21. The second setting ring is supported via an axial bearing 34 on a pressure plate 35 which is held by plate spring packages 36 in the flange plate 22. The pressure plate 35 simultaneously acts on pressure pins 37 which penetrate the flange plate 22. Ball grooves in the setting rings 23, 26 holding the balls 29 are provided in the form of ramps rising across the circumference in opposite directions. The electric motor is shown to have cable connections 38, 39. By driving the electric motor 11, the tooth segment 25 and thus the first setting ring 23 are rotated relative to the second setting ring 26 which, via the holding lug 27, engages the drive housing and which, as a result, is axially displaced against the returning force of the plate springs 36 and in consequence, loads the pressure pins 37. Further details as regards the functioning of the setting rings can be obtained from the description of the following drawings.

A voltage reversing circuit 49 and a motor speed recording device 48 for the electric motor 11 are logically connected to each other as a function of the idling speed of the electric motor 11 in such a way that the voltage reversing circuit 49 is disconnected if, in the course of the device being returned, the idling speed of the electric motor is reached. The voltage reversing circuit applies either on positive or negative voltage to the electric motor 11 as desired. The voltage reversing circuit 49 also acts as a short circuit switching assembly when short circuiting of the electric motor 11 is desired. Likewise, the motor speed recording device 48 operates as a rotational position sensor for indicating a position of the setting ring.

Figure 8:
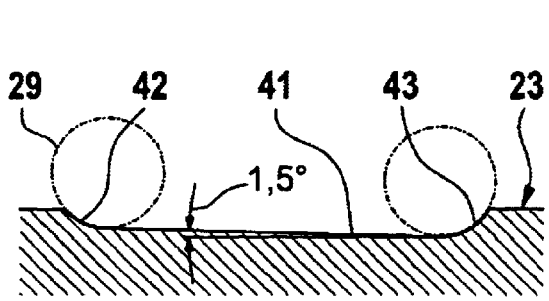
FIG. 8 shows a cylindrical section through a groove in an enlarged view.
Figures 9, 10:
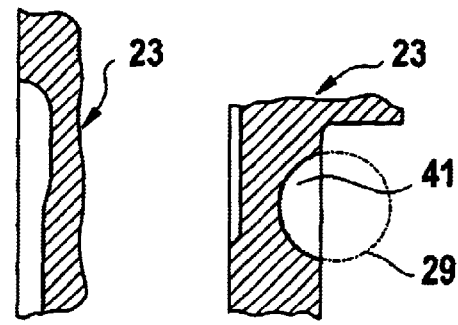
FIG. 9 shows the detail X of FIG. 7.
FIG. 10 shows the detail Y of FIG. 7.
Figure 11:
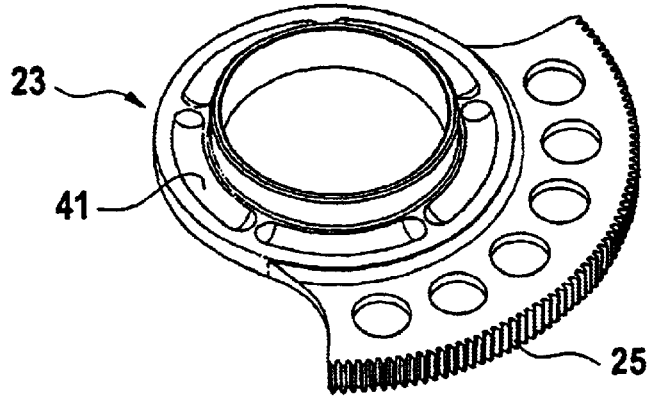
FIG. 11 shows the setting ring according to FIG. 6 in a perspective view.
Figures 12, 13, 15:
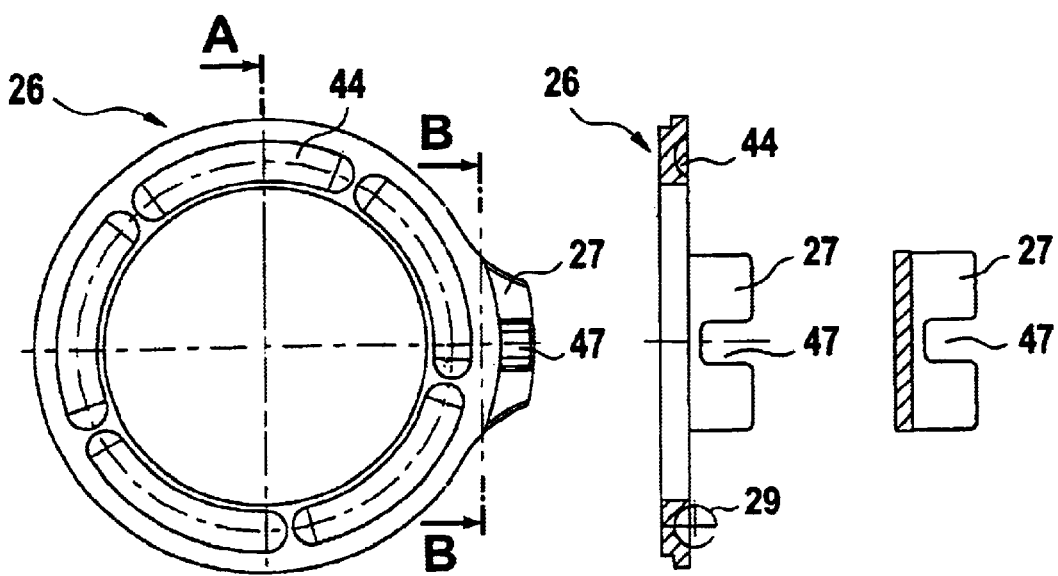
FIG. 12 shows the second setting ring of the device according to FIG. 1 in a plan view of the end face comprising the grooves.
FIG. 13 shows the setting ring according to FIG. 12 in a sectional view along line A—A.
FIG. 15 shows the section B—B of FIG. 12.

FIGS. 6 to 11, again, will be described jointly below. The first setting ring 23 with the tooth segment 25, in its end face, has five ball grooves 41 which are circumferentially distributed at a pitch angle of 72° and which each span a circumferential length of 58°. As can be seen in FIG. 8, the ball grooves, across the ring circumference, have a helical angle of 1.5° and thus a variable depth between two stops 42 and 43 for the balls 29. In the sectional view of the ball groove, the ball is shown in its two stopping positions in a dash-dotted line.

Figure 14:
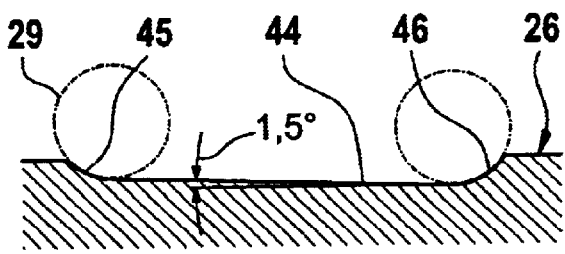
FIG. 14 shows a cylindrical section through a groove in an enlarged view.
Figure 16:
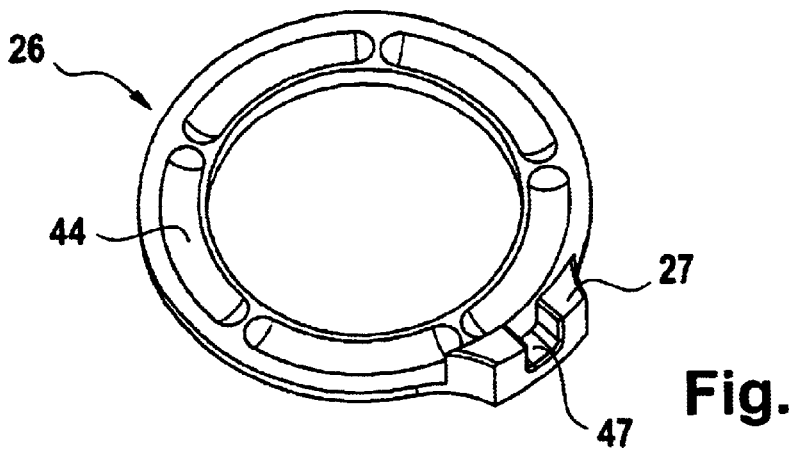
FIG. 16 shows the setting ring according to FIG. 12 in a perspective inclined view.

FIGS. 12 to 16 will also be described jointly below. In its end face, the second setting ring 26 includes five ball grooves 44 which are circumferentially distributed at a pitch angle of 72° and span a circumferential length of 58°. The holding lug 27 with the guiding groove 47 is clearly drawn. As can be seen in FIG. 14, the ball grooves have a variable depth across the circumference due to a helical angle of 1.5° and include two stops 45, 46 for the balls 29. One ball is shown in dash-dotted lines in its two stopping positions.

The rising gradients of the ball grooves 44 in the second setting ring 26 rise in the same direction as the gradients of the ball grooves 41 in the first setting ring 23. As the setting rings 23, 26 are mounted in such a way that their end faces containing the ball grooves 41, 44 face one another, a relative rotation of the two setting rings relative to one another causes a ball 29 to roll so as to rise simultaneously in both ball grooves 41, 44 or so as to descend simultaneously. The cage holds the balls in the ball grooves in positions which correspond to one another. A relative rotation of the two setting rings 23, 26 relative to one another in a first direction thus pushes the two setting rings 23, 26 apart, whereas a relative rotation in the opposite direction allows said two setting rings 23, 26 to approach one another. The former is achieved entirely by driving the electric motor; the latter is achieved in particular by the returning force of the plate springs 36.

Figure 17:
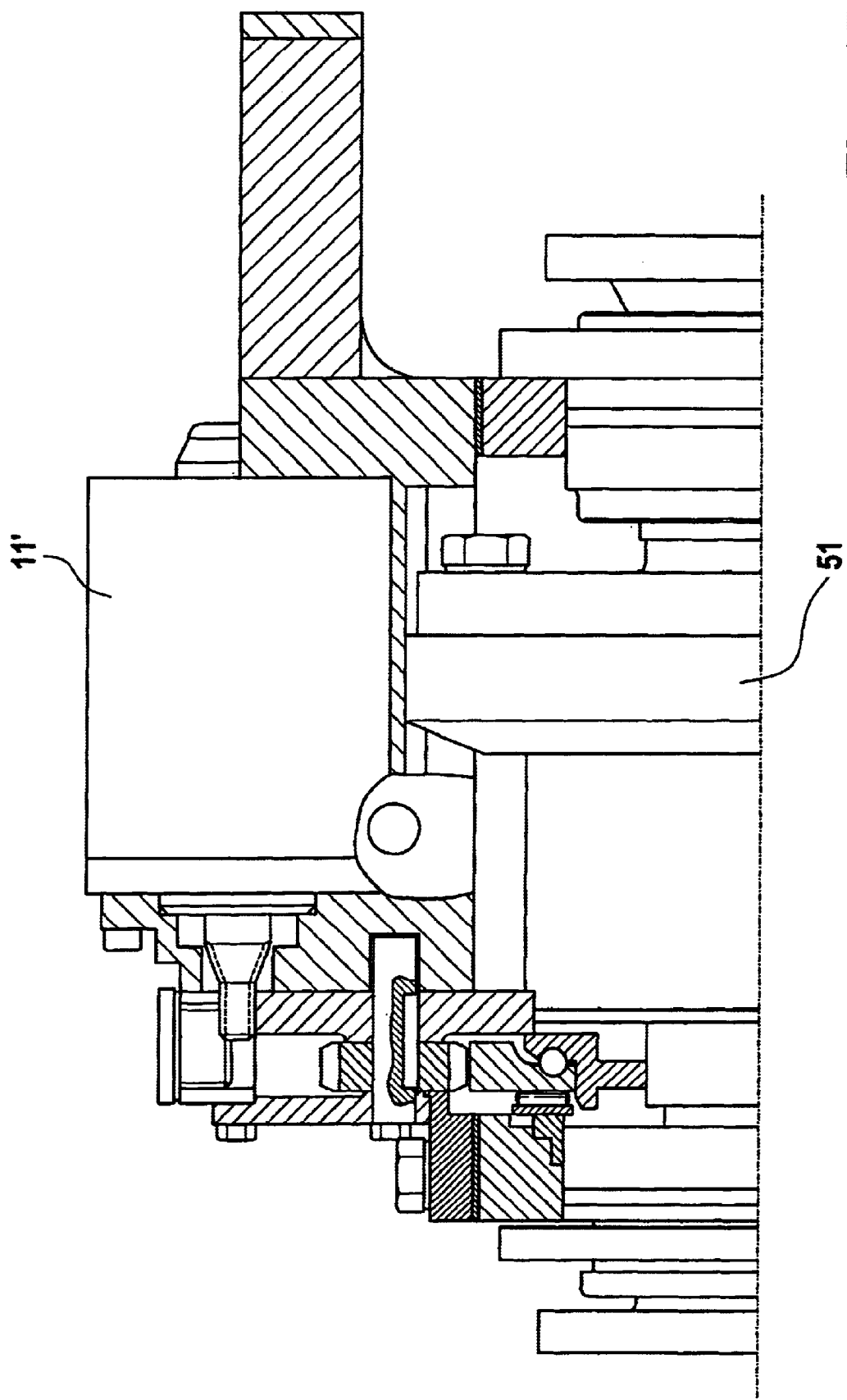
FIG. 17 shows an inventive setting device used together with a differential gear in a partial section.
Figure 18:
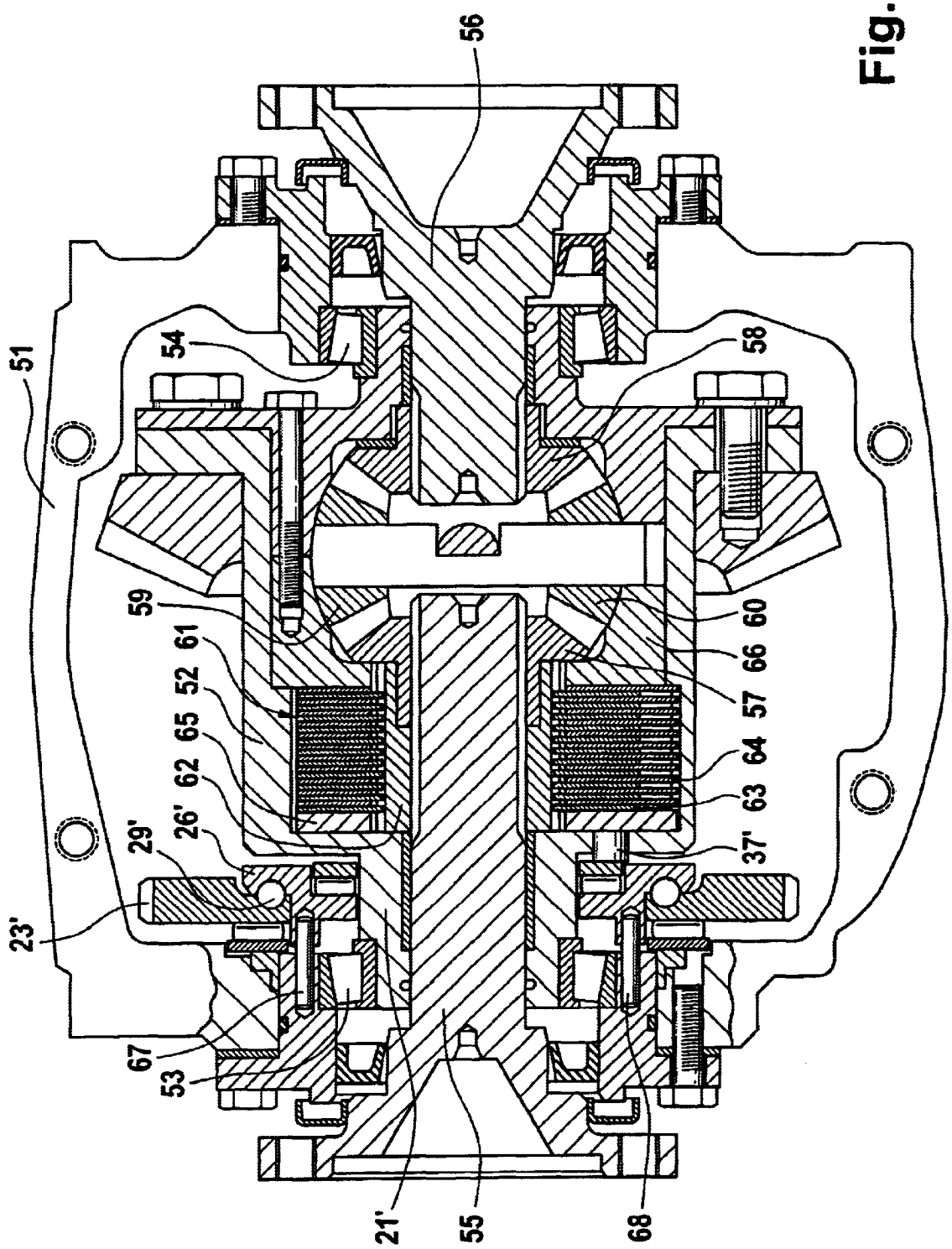
FIG. 18 shows an assembly according to FIG. 17 in an axial view.

FIGS. 17 and 18, will be described jointly below. A setting device of the above-mentioned type can be mounted in a differential drive 51. In this case, the bearing sleeve 21' is integral with a differential carrier 52 which is rotatably supported in the differential drive via rolling contact bearings 53, 54. In the differential carrier 52, there are supported two axle shafts 55, 56 which carry bevel gears 57, 58 which engage differential bevel gears 59, 60. A friction coupling 61 includes first friction plates 63 which are connected in a rotationally fast way to a sleeve 62 which is secured to an axle shaft 55, as well as two friction plates 64 which are connected to the differential carrier 52 in a rotationally fast way. The friction coupling 61 is arranged between an axially displaceable pressure plate 65 and a supporting member 66 fixed in the differential carrier 52. The pressure plate 65 can be loaded directly by the pressure pins 37' which are displaced when the first setting ring 23' rotates relative to the second setting ring 26'. The second setting ring 26' is held in a rotationally fast way by pins 67, 68 which engage holding lugs 27 and which are secured in the differential drive housing 51. By rotating the setting ring 23 in a first direction, the friction coupling 61 is closed, so that the differential drive develops a locking effect, whereas by returning the setting ring 23, the friction coupling 61 is disconnected, so that the differential drive again becomes an open differential.

Figure 19:
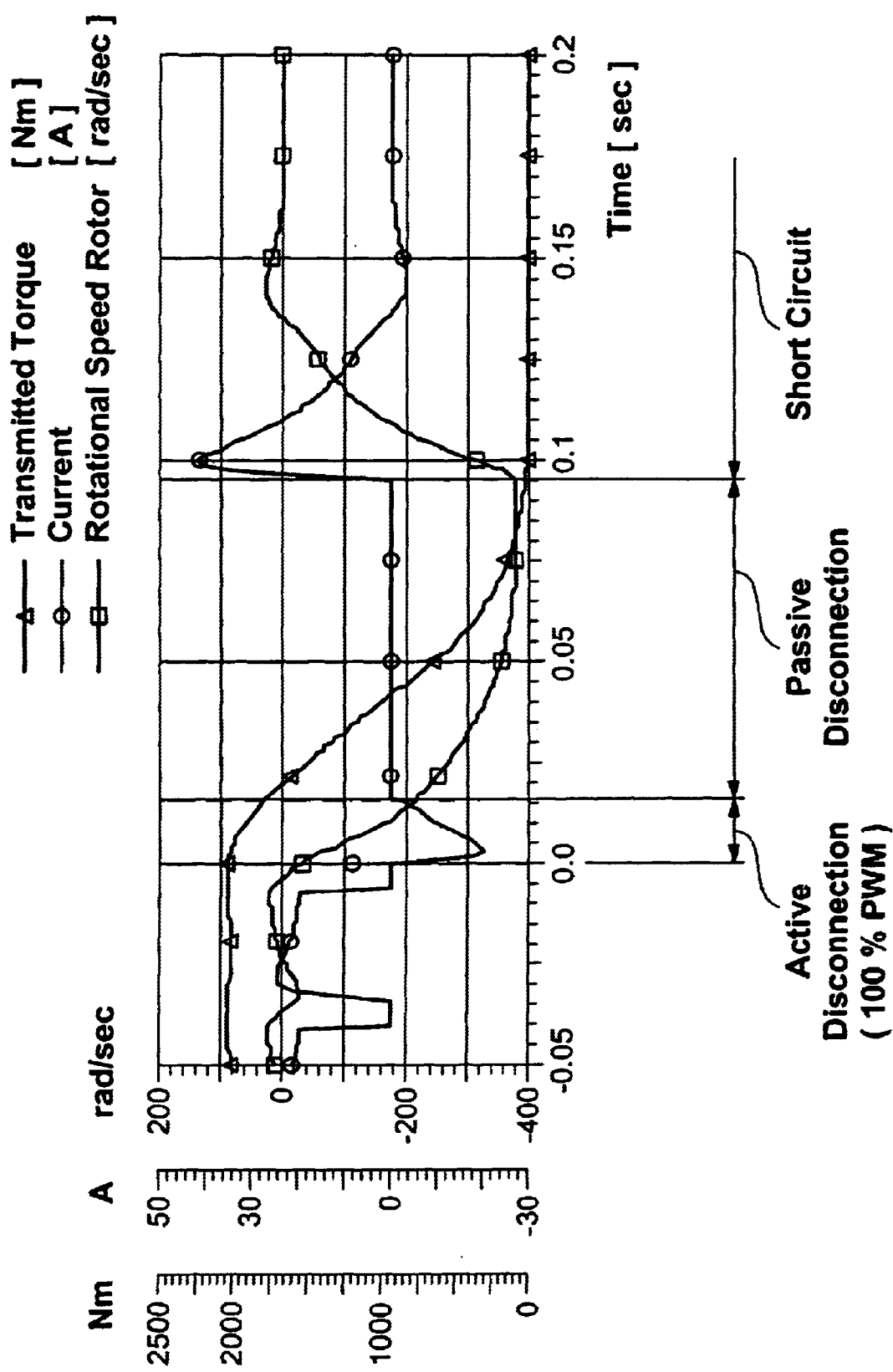
FIG. 19 shows different characteristics of an optimised disconnection strategy.

FIG. 19 shows the above-mentioned process of disconnecting a friction coupling with reference to various characteristics on a time axis. These characteristics are the torque transmitted by the friction coupling (torque transmitted), the current in the electric motor (current) and its rotor's rotational speed (rotational speed rotor). In the negative time range, the setting device is shown in the outermost advanced position. Starting from time 0.0, the setting device is returned as quickly as possible into the starting position, avoiding any stopping jerks. In the negative time range, the current is characterised by pulse width modulation with rectangular jumps between 0 and approximately 25 A. The torque transmittable by the friction coupling is constant at approximately 2000 Nm. The rotational speed of the electric motor fluctuates with the frequency of the pulse width modulation approximately around 0.

At the time 0.0, the electric motor is subjected to negative current (active disconnection), as a result of which the engine speed increases to returning negative values, with the transmittable torque decreasing due to the friction coupling being opened. After approximately 0.01 seconds, the current is switched off, so that at the time of 0.015 seconds, the current in the electric motor becomes 0. The disconnection of the current (passive disconnection) has been chosen to be such that, approximately after the elapsed time, the motor reaches its nominal speed of approximately 200 radian/sec., so that thereafter, due to the effect of the plate springs, the speed can continue to increase in returning. The transmittable torque continues to decrease up to a time of 0.095 seconds. At that point in time, the electric motor is short-circuited, so that, within the shortest possible time, a short-circuit current reaches a value of approximately 45 A. As a result, the speed of the motor, up to the time of 0.14 seconds, is again braked to 0, as a result of which only slight overshooting occurs. The transmittable torque had already previously reached the value 0. As a result of the braking process initiated by the electric motor, the balls stop against the groove stops in a completely impact-free way.

Figure 20:
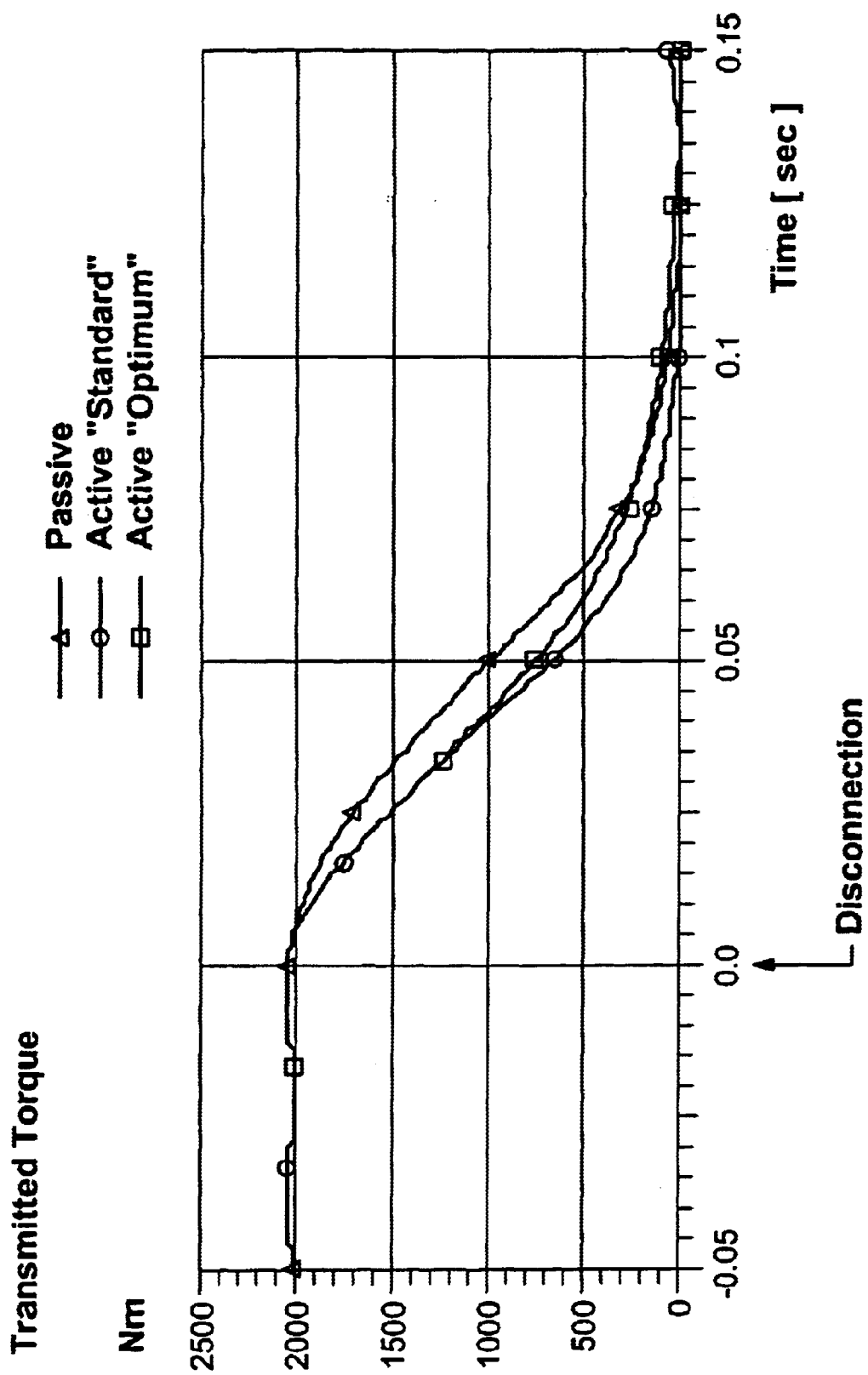
FIG. 20 shows the torque curve for the inventive disconnection strategy in connection with prior art strategies.

FIG. 20 shows the torque curve (transmitted torque) of the friction coupling as a function of time as a result of the application of negative current (active "optimum") being interrupted in accordance with the invention, as compared to a permanent application of negative current (active "standard") and the return motion taking place entirely as a result of spring force (passive). The return motion under spring force is referred to as being "passive"—it can be seen that such spring force effects the slowest decrease in transmittable torque. "Active standard" refers to the permanent application of negative current to the electric motor which, due to an internal voltage being induced, from approximately 0.04 seconds onwards, leads to a clear reduction in the transmittable torque, whereas "active optimum" indicates the application of negative current which, after the idling speed has been reached, is interrupted after approximately 0.04 seconds, which results in the quickest possible decrease in the transmittable torque.

Figure 21:
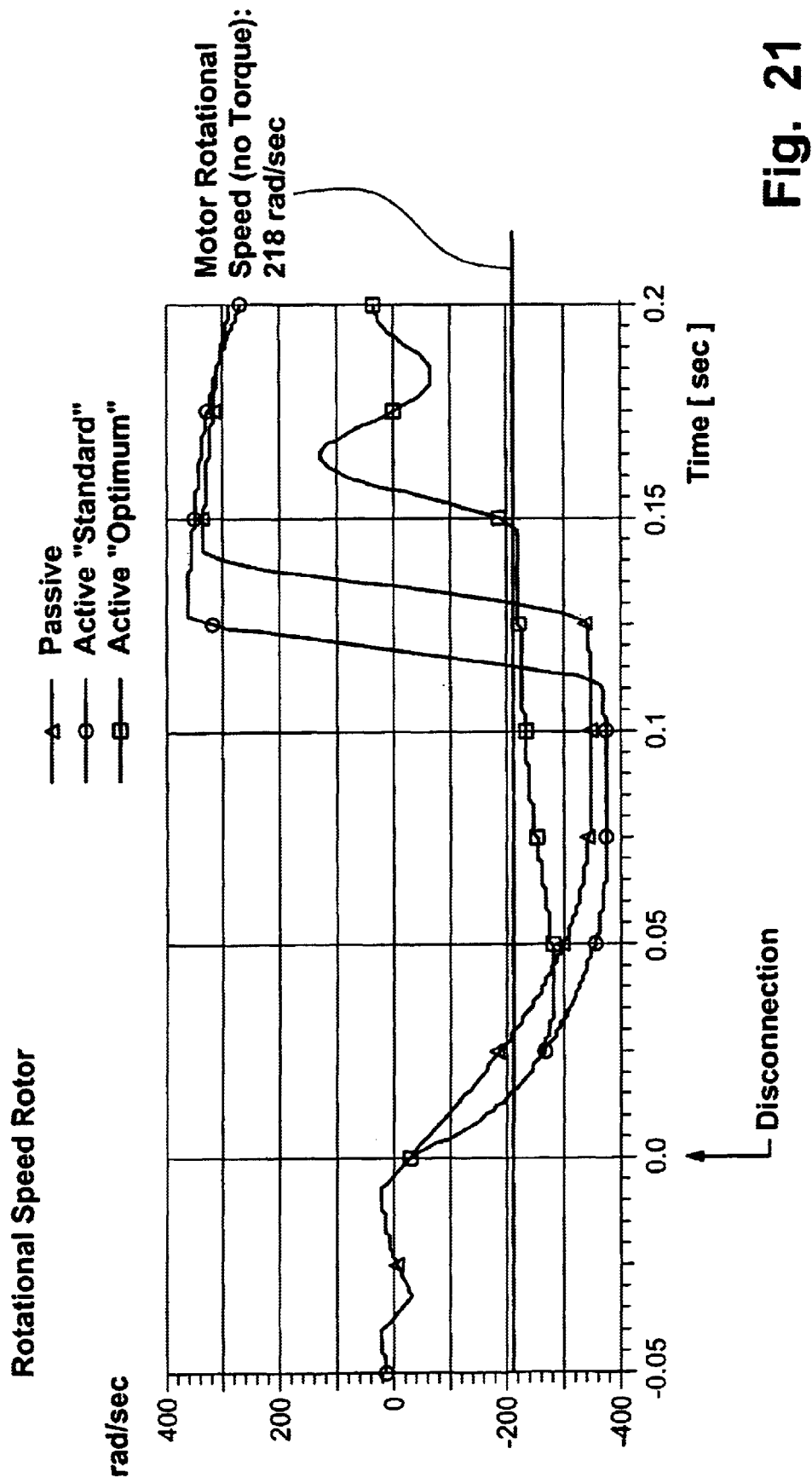
FIG. 21 shows the motor speed as a function of time for the inventive disconnection strategy according to FIG. 20 as compared to strategies according to the state of the art.

For the three types of disconnection described in connection with FIG. 20, FIG. 21 shows the curves of the returning speeds of the electric motor (rotational speed rotor) as a function of time. The spread, in terms of time, of the increases in rotational speed is responsible for the above-mentioned torque decreases, with the speed 0 occurring when the balls reach the end stops in the ball grooves. In the case of the permanent application of negative current (active standard), this takes place at the latest point in time and especially much later than in the case of the free (passive) return motion, whereas the short application of negative current (active optimum) in accordance with the inventive method leads to the balls reaching the stops in the quickest way, which is characterised by the zero crossing of the speed curve accompanied by a related overshoot. The overshoot indicates the return motion of the motor as a result of jerk-like spring-back at the end stops in the ball grooves.

Figure 22:
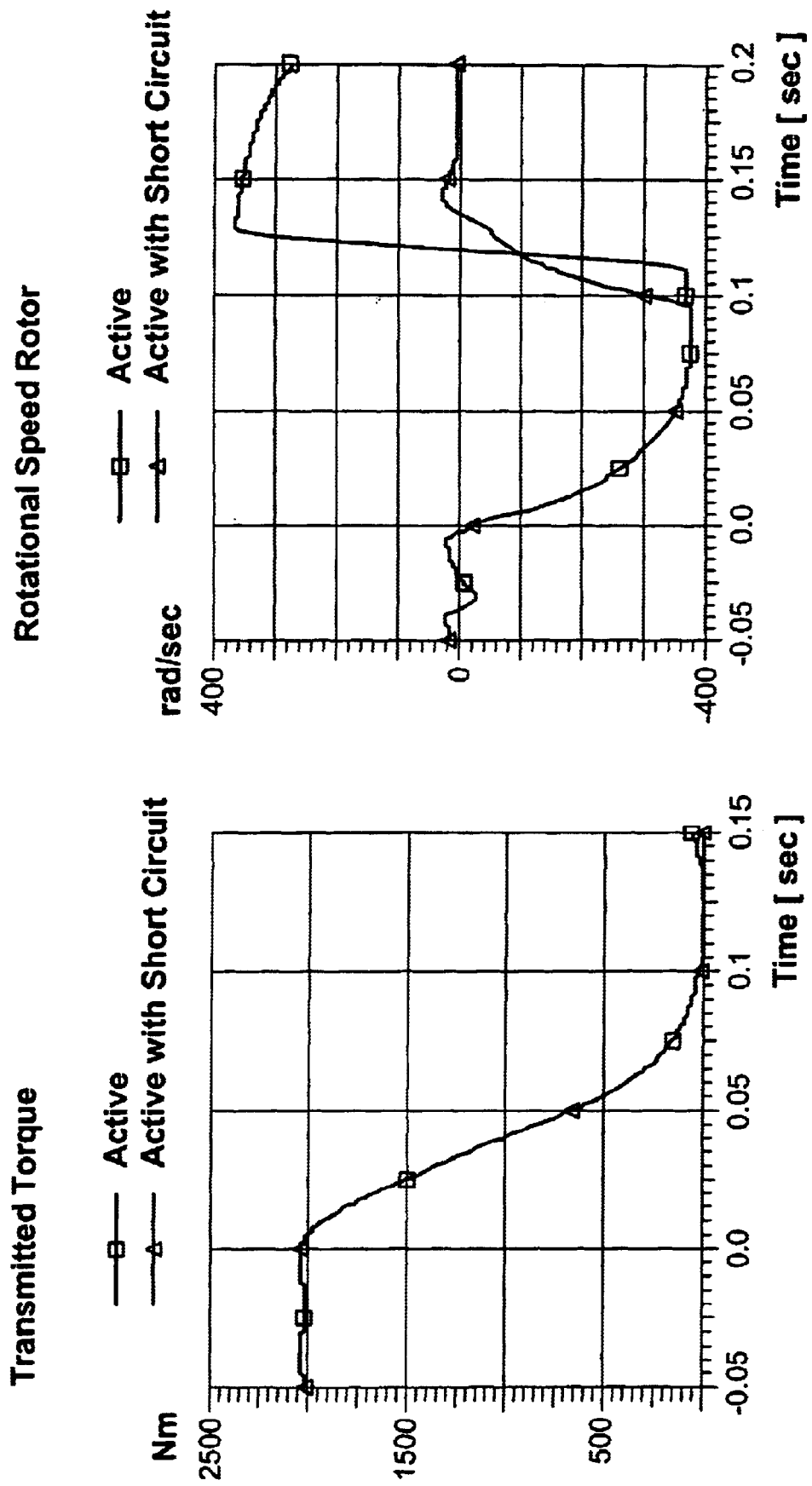
FIG. 22 shows the characteristic curves for the torque and engine speed as a function of time for an inventive braking strategy.

FIG. 22 shows two processes which are similar to those shown in FIGS. 20 and 21, i.e. the illustration of the transmittable torque (transmitted torque) and the illustration of the motor speed in the case of the return motion (rotational speed rotor) and which refer to a further advantageous control process which takes place directly prior to the balls reaching the end stops in the ball grooves.

The curves marked "active" refer to the torque and speed curves resulting from the short application of negative current in accordance with the process type "active optimum" according to FIGS. 20 and 21. The "active" curves show the steep decrease in the returning negative motor speed to 0 and the overshoot to a clearly positive speed when the balls hit the stops in the ball grooves hard. The curves "active with short circuit" refer to the torque and speed curves under the influence of electric motor short-circuiting shortly before the balls hit the stops. The short-circuiting ensures early braking of the motor, so that the speed is returned to 0 in a practically impact-free way. The undesirable hard impact of the balls against the ends of the ball grooves is thus avoided.

From the foregoing, it can be seen that there has been brought to the art a new and improved electromechanical torque control system and method which includes the elimination of stopping noise. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A method of controlling an electro-mechanical axial setting device, wherein the axial setting device comprises:
    two setting rings (23, 26) centered on a common axis, one of which is axially held, with the other one being axially displaceably mounted, and one of which is rotationally fixedly held in a housing, with the other one being rotatingly drivable,
    the two setting rings (23, 26), on their respective end faces facing one another, each comprise an identical plurality of circumferentially extending grooves (41, 44),
    the grooves (41, 44), in a plan view of the end faces, comprise depths which rise in the same circumferential direction, and form pairs of grooves (41, 44) in the two setting rings (23,26) each pair accommodating a ball (29),
    wherein the rotatingly drivable setting ring (23) is connected to an electric motor (11), and the axially displaceable setting ring (26) is loaded by pressure springs towards the axially held setting ring (23),
    the method comprising:
        applying a positive voltage to the electric motor (11) to move the axial setting device into an advanced position;
        disconnecting the positive voltage from the electric motor (11) to return the axial setting device into a starting position; and
        during the return motion, shortly before the starting position is reached, short-circuiting the electric motor (11) to generate a braking moment.

2. A method according to claim 1 comprising during the return motion, when the axial setting device approximately reaches the starting position, eliminating said short-circuiting at the electric motor (11).

3. A method according to claim 1 further comprising, during the return motion, applying a negative voltage to the electric motor (11) until the electric motor has reached an idling speed.

4. A method of controlling an electro-mechanical axial setting device wherein the axial setting device comprises:
    two setting rings (23, 26) centered on a common axis, one of which is axially held, with the other one being axially displaceably mounted, and one of which is rotationally fixedly held in a housing, with the other one being rotatingly drivable,
    the two setting rings (23, 26), on their respective end faces facing one another, each comprise an identical plurality of circumferentially extending grooves (41, 44),
    the grooves (41, 44), in a plan view of the end faces, comprise depths which rise in the same circumferential direction and form pairs of grooves (41,44) in the two setting rings (23,26) each pair accommodating a ball (29),
    wherein the rotatingly drivable setting ring (23) is connected to an electric motor (11), and the axially displaceable setting ring (26) is loaded by pressure springs towards the axially held setting ring (23),
    the method comprising:
        applying a positive voltage to the electric motor (11) to move the axial setting device into an advanced position;
        disconnecting the positive voltage from the electric motor (11) to return the axial setting device into a starting position; and
        during the return motion, shortly before the starting position is reached, applying a positive voltage to the electric motor (11) to generate a braking moment.

5. A method according to claim 4 comprising during the return motion, when the axial setting device approximately reaches the starting position, eliminating said positive voltage connection at the electric motor (11).

6. A method according to claim 4 further comprising, during the return motion, applying a negative voltage to the electric motor (11) until the electric motor has reached an idling speed.

7. An electro-mechanical axial setting device comprising:
    two setting rings (23, 26) centered on a common axis, one of which is axially held, with the other one being axially displaceably mounted, and one of which is rotationally fixedly held in a housing, with the other one being rotatingly drivable.
    the two setting rings (23, 26), on their respective end faces facing one another, each comprise an identical plurality of circumferentially extending grooves (41, 44),
    the grooves (41, 44), in a plan view of the end faces, comprise depths which rise in the same circumferential direction, and form pairs of grooves (41, 44) in the two setting rings (23,26) each pair accommodating a ball (29),
    wherein the rotatingly drivable setting ring (23) is connected to an electric motor (11), and the axially displaceable setting ring (26) is loaded by pressure springs towards the axially held setting ring (23), and
    a rotational position sensor arranged at a rotating part of the axial setting device for controlling a short circuit switching assembly for the electric motor, and
    a control mechanism for applying a positive voltage to the electric motor (11) to move the axial setting device into an advanced position, disconnecting the positive voltage from the electric motor (11) to return the axial setting device into a starting position and, during the return motion, shortly before the starting position is reached, short-circuiting the electric motor (11) to generate a braking moment.

8. An axial setting device according to claim 7 comprising a rotational position sensor for interrupting the short circuiting of the electric motor when a rotational stop of the axial setting device in a starting position has been reached.

9. An axial setting device according to claim 7 comprising a voltage reversing circuit for the electric motor and a motor speed recording device for the electric motor.

10. An electro-mechanical axial setting device comprising:
    two setting rings (23, 26) centered on a common axis, one of which is axially held, with the other one being axially displaceably mounted, and one of which is rotationally fixedly held in a housing, with the other one being rotatingly drivable,
    the two setting rings (23, 26), on their respective end faces facing one another, each comprise an identical plurality of circumferentially extending grooves (41, 44),
    the grooves (41, 44), in a plan view of the end faces, comprise depths which rise in the same circumferential direction, and form pairs of grooves (41, 44) in the two setting rings (23,26) each pair accommodating a ball (29), wherein the rotatingly drivable setting ring (23) is connected to an electric motor (11), and the axially displaceable setting ring (26) is loaded by pressure springs towards the axially held setting ring (23), and a rotational position sensor arranged at one of the rotating parts of the axial setting device for controlling a voltage connection for the electric motor, and a control mechanism for applying a positive voltage to the electric motor (11) to move the axial setting device into an advanced position, disconnecting the positive voltage from the electric motor (11) to return the axial setting device into a starting position and, during the return motion, shortly before the starting position is reached, applying a positive voltage to the electric motor (11) to generate a braking moment.

11. An axial setting device according to claim 10 comprising a rotational position sensor for interrupting the voltage connection of the electric motor when a rotational stop of the axial setting device in a starting position has been reached.

12. An axial setting device according to claim 10 comprising a voltage reversing circuit for the electric motor and a motor speed recording device for the electric motor.

* * * * *